United States Patent [19]

Smith

[11] Patent Number: 5,394,531

[45] Date of Patent: Feb. 28, 1995

[54] DYNAMIC STORAGE ALLOCATION SYSTEM FOR A PRIORITIZED CACHE

[75] Inventor: Kevin F. Smith, San Jose, Calif.

[73] Assignee: International Business Machines Corporation, Armonk, N.Y.

[21] Appl. No.: 793,763

[22] Filed: Nov. 18, 1991

Related U.S. Application Data

[63] Continuation-in-part of Ser. No. 332,870, Apr. 3, 1989, abandoned.

[51] Int. Cl.⁶ .................. G06F 12/08; G06F 12/22
[52] U.S. Cl. ............................................... 395/425
[58] Field of Search ............... 395/425; 364/DIG. 1, 364/DIG. 2

[56] References Cited

U.S. PATENT DOCUMENTS

| | | | |
|---|---|---|---|
| 4,315,312 | 2/1982 | Schmidt | 395/425 |
| 4,430,712 | 2/1984 | Coulson et al. | 395/600 |
| 4,458,310 | 7/1984 | Chang | 395/425 |
| 4,463,424 | 7/1984 | Mattson et al. | 395/425 |
| 4,489,378 | 12/1984 | Dixon et al. | 395/425 |
| 4,503,501 | 3/1985 | Coulson et al. | 395/425 |
| 4,603,382 | 7/1986 | Cole et al. | 395/250 |
| 4,947,319 | 8/1990 | Bozman | 395/700 |

FOREIGN PATENT DOCUMENTS 0391871  10/1990  European Pat. Off. .

OTHER PUBLICATIONS

"Allocation of Cache Memory Among Competing Processes", IBM Tech. Disclosure Bulletin, vol. 31, No. 9, 1989, pp. 204–208.

*Primary Examiner*—Jack B. Harvey
*Assistant Examiner*—Jack A. Lane
*Attorney, Agent, or Firm*—Baker, Maxham, Jester & Meador

[57] ABSTRACT

Methods for managing a Least Recently Used (LRU) cache in a staged storage system on a prioritized basis permitting management of data using multiple cache priorities assigned at the data set level. One method uses the signed difference between an assigned and actual hit ratio to dynamically allocate cache size to a class of data and its correlation with priority of that class. Advantageously, the hit ratio performance of a class of data can not be degraded beyond a predetermined level by a class of data having lower priority. Another method dynamically reallocates cache space among partitions asymptotically to the general equality of a weighted hit rate slope function attributable to each partition. This function is the product of the slope of a weighting factor and the partition hit rate versus partition space allocation function. Cache space is dynamically reallocated among the partitions in a direction that forces the weighted hit rate slope for each partition into equality over the entire cache. Partition space is left substantially unchanged in those partitions where the weighted hit rate slope is non-positive. Hit rate is defined as hit ratio times I/O rate.

12 Claims, 12 Drawing Sheets

```
i = "Highest priority class value";
n = "Total amount of cache resource";
WHILE ((i > 0) AND (n > 0)) DO
    BEGIN
        m = "Amount of cache resource needed to meet target #i
            for priority class # i";
        m = MIN(m, n);
        "Allocate m units of cache resource to priority # i";
        n = n - m;
        i = i - 1;
    END WHILE;
IF (n > 0) THEN
    "Distribute the cache resources represented by n among the
    various priority classes";
```

FIG. 1

```
/* Constants and structured constants */
CONST
/* For the purpose of simplifying the pseudo-code, assume that  */
/*   the number of priority classes is a constant.              */
/* Using the priority class example, the priority classes       */
/*   ranged in value from 0..3. So, the high priority number    */
/*   in this case is 3 (i.e., HighPriorityNo = 3;).             */
HighPriorityNo = "Highest Priority number";
/* A running average (RA) is to be kept of the read hit ratio
/*   for each cached priority class.                            */
/* When the running average falls below the target for that     */
/*   class, then the cache size allocation must be increased    */
/*   if possible). The amount of the cache size increase is a   */
/*   function of how far below the target the running average   */
/*   read hit ratio is.  The assumption is that for every       */
/*   'HRmultiplier' percentage point that the hit ratio is too  */
/*   low, the cache size is to be doubled.                      */
HRmultiplier = "change in RA read hit ratio per double cache
                size") /*20.0 is not an unreasonable number    */
/* Periodically (for example, every 150 seconds or longer), the */
/*   performance of the prioritized cache should be checked.    */
/*   The constant 'Inter_monitor_Time' represents this periodic */
/*   checking interval.                                         */
/* The interval should be chosen so as to not occur so often as */
/*   to affect system performance or to become overly sensitive */
/*   to minute workload variations, but often enough so that    */
/*   logical partition sizes are able to become adequately      */
/*   adjusted to what is going on.                              */
Inter_monitor_Time = "Inter-monitor Time")

/* For the purposes of describing the pseudo-code, it will be   */
/*   assumed that the target read hit ratios are stored in the  */
/*   array constant: 'PriorityTargets'.                         */
/* In practice, an array variable can be used in exactly the    */
/*   same way as the array constant is used here, and the       */
/*   variable could be initialized by reading the values from a */
/*   parameter file or by user enquiry.                         */
PriorityTargets = ARRAY &lbrk. 1...HighPriorityNo &rbrk.
                  OF Integer = 'RA Read Hit Ratio target values
                               for each priority class';
                  /* example:  &lbrk. 55, 87, 90 &rbrk.         */
```

FIG. 2

```
/* Type definitions for variables */
TYPE
  /* Each element of information in the cache is represented as a*/
  /*      variable of type:  'Cache_Information_node_ty'.        */
  /* Within this variable is found the necessary information to*/
  /*   identify the data it represents (i.e., the data address), */
  /*   the data contents, and linked-list information for keeping */
  /*   its position on both the LRU and the hash chains.         */
  /* In the data fields shown below, only the doubly-linked     */
  /*   pointers for the LRU and the hash chains are actually*/
  /*   described.                                               */
Cache_ptr = -> Cache_Information_node_ty;
Cache_Information_node ty = RECORD
  NextP   : Cache_ptr; /*-> next node in hash entry linked list */
  PrevP   : Cache_ptr; /*-> prev node in hash entry linked list */
  OldP    : Cache_ptr; /*-> next least referenced cache node */
  YoungP  : Cache_ptr; /*-> next more recently ref'd cache node*/
  .
  . (other necessary fields go here)
  .
END Cache_Information_node_ty;
/* In order to ensure appropriate cache performance for each*/
/*   priority class, results dealing with cache usage must be*/
/*   kept and periodically analyzed.                          */
/* There must be variables of the following type for each    */
/*   cached priority class (i.e., 1..HighPriorityNo).         */
Prioritized Cache_node_ptr  = -> Prioritized_Cache_node_ty;
Prioritized Cache_node_ty = RECORD
  TotReads    : Integer;    /* count of Read I/Os to a priority*/
                            /*    class                        */
  TotReadHits : Integer ;   /* count of Read Hits to a priority*/
                            /*    class                        */
  PrevReads   : Integer;    /* value of TotReads last time     */
                            /*    checked                      */
  PrevReadHits: Integer;    /* value of TotReadHits last time  */
                            /*    checked                      */
  RAReads     : Integer;    /* running average of # of Read    */
                            /*    I/Os                         */
  RAReadHits  : Integer;    /* running average of # of Read    */
                            /*    Hits                         */
  CacheSz     : Integer;    /* # of cache nodes currently      */
                            /*    assigned                     */
  OldCacheP   : Cache_ptr;  /* -> to Trailer cache node        */
  YoungCacheP : Cache_ptr;  /* -> to Header cache node         */
END Prioritized_Cache_node_ty;
```

FIG. 3

```
/* Global variables used in the pseudo-code */
VAR
/* The array of data variables which are to keep the raw   */
/*    statistics needed in order to ensure adequate prioritized */
/*    caching performance.                                  */
PrioritizedCacheInfo :/* Information for each priority class */
    ARRAY &lbrk. 1..HighPriorityNo &rbrk. OF
        Prioritized_Cache_node_ty;
/* A variable is needed in order to give a relative time   */
/*    reference as to when the hit ratio statistics for each of */
/*    the priority classes should be rechecked (to ensure  */
/*    adequate performance on average).                    */
/* Here it is assumed that 'Time_of_Day_ty' has been defined */
/*    and contains enough information in order to determine the */
/*    number of seconds between two 'Time_of_Day_ty' variables.*/
StartTime : Time_of_Day_ty;
```

FIG. 4

```
PROCEDURE Main;
  VAR /* Main */
    PresentTime : Time_of_Day_ty;
  BEGIN /* Main procedure */
    Initialize;
    REPEAT /* Handle the next I/O (if applicable) */
        IF "there is a Prioritized Cache I/O to issue" THEN
          BEGIN
            Issue_Prioritized_Cache_IO("I/O Priority number");
          END IF;

/* Periodically tune the performance of the prioritized */
        /*    cache.                                             */
        PresentTime = "the Present Time";
        IF ((PresentTime - StartTime >= Inter_monitor_Time)
            AND ("Enough I/Os have occurred so as to provide a
                meaningful sample")) THEN
          BEGIN
            Prioritized_Caching_Tuning;
            StartTime = "the Present Time";
          END IF;

UNTIL "Done";
  END Main;
```

FIG. 5

```
PCWW_ty = RECORD STRUCTURE
  EInterval  : Integer;  /* # seconds between intervals    */
  EIntBase   : Integer;  /* Time of last interval eval.    */
END; /* PCWW_ty */

PC_entry_ptr =  -> PC_entry_ty;
PC_entry_ty  = RECORD
  NextP        : PC_entry_ptr;
  SzChg        : Integer;  /* Amt cache to add to this prior */
  Weight       : Integer;  /* Weighting value for this priority */
  TotIOs       : Integer;  /* Total #I/Os to this priority */
  TotReads     : Integer;  /* Total #Reads to this priority */
  TotReadHits  : Integer;  /* Total #Read Hits/this priority */
  PrevReads    : Integer;  /* Total #Reads/prty, prev. intv */
  PrevReadHits : Integer;  /* Total #Read Hits, prev. intvl */
  CacheSz1     : Integer;  /* Cache nodes alloc'd this prty */
  CacheSz0     : Integer;  /* Cache nodes prev. alloc'd */
  RHR0         : Real;     /* Prev. interval Rd HR this prty */
  nIOs         : Integer;  /* #Reads in current interval */
  RHR1         : Real;     /* Curr. interval Rd HR this prty */
  _            : Real;     /* temp. var. used in tuning */
  PriorityNo   : Integer;  /* class priority ranking */
END; /* PC_entry_ty */
```

FIG. 9

```
Default_EInterval: Integer;        /* set to # secs in EvalIntervl */
VolatilityIndex   : Real;          /* set to a value between 0 & 1 */
PC                : PCWW_ty;
PriCacheP         : PC_entry_ptr;  /* -> Priority Class chain       */
```

FIG. 10

```
/* General Initialization */
BEGIN
    Default_EInterval: = 50;   /* example, 50 seconds */
    VolatilityIndex   : = 0.10; /* example, Volatility Index of 10% */

PC.EInterval: = Default_EInterval;
    PC.EIntBase  := Current_Time();
    PriCacheP    : = NULL;
END; /* General Initialization */
```

FIG. 11

```
/* Create and Initialize a new Priority Class */
/* Priority Number of new class is:  CPriNo */
VARIABLES
  curr: PC_entry_ptr;
  last: PC_entry_ptr;
BEGIN
  last: = NULL;
  curr: = PriCacheP;
 WHILE ((curr <> NULL)AND (curr.> PriorityNo < CPriNo)) DO
  BEGIN
    last: = curr;
    curr: = curr.>NextP;
END; /* while */
IF((curr<> NULL)AND (curr.>PriorityNo = CPriNo))THEN
/* do nothing,we already have a node for this priority class */
ELSE
  BEGIN
    IF (last = NULL) THEN
      BEGIN
        Allocate_Storage_for(last);
        PriCacheP: = last;
      END; /* if */
    ELSE
      BEGIN
        Allocate_Storage_for(last-> NextP);
        last: = last-> NextP;
      END; /* else */
    last- > NextP        := curr;
    last-> PriorityNo    := CPriNo;
    last-> SzChg         := 0
    last-> Weight        := last->PriorityNo;
    last-> TotIOs        := 0;
    last-> TotReads      := 0;
    last-> TotReadHits   := 0;
    last-> CacheSz1      := Initial_Cache_Allocation_for(CPriNo);
    last-> CacheSz0      := last-> CacheSz1;
    last-> RHR0          := 0.0;
    last-> RHR1          := last-> RHR0;
  END; /* else */
  END; /* Create and Initialize a new Priority Class */
```

FIG. 12

DYNAMIC STORAGE ALLOCATION SYSTEM FOR A PRIORITIZED CACHE

CROSS-REFERENCE TO RELATED APPLICATIONS

The present application is a continuation-in-part of U.S. patent application Ser. No. 07/332,870, filed on Apr. 3, 1989, now abandoned entitled "A Method For Managing An LRU Prioritized Cache".

BACKGROUND OF THE INVENTION

1. Field of the Invention

This invention relates to computer storage of information, and more particularly, to a method for allocating cache storage resources in a multi-echelon staged storage system with reference to prioritized data sets and weighting factors.

2. Description of the Related Art

A computer system typically includes an information processor coupled to a heirarchical staged storage system. The type of storage employed in each staging location relative to the processor is normally determined by balancing requirements for speed, capacity, and cost. Computer processes continually refer to this storage over their executing lifetimes, both reading from and writing to the staged storage system. These references include self-referencing as well as references to every type of other process, overlay or data. It is well-known in the art that data storage devices using high-speed random access memory (RAM) can be referenced orders of magnitude faster than high volume direct-access storage devices (DASD's) using rotating magnetic media. Such electronic RAM storage typically relies upon high-speed transfer of electrical charges over short distances while DASD's typically operate mechanically by rotating a data storage position on a magnetic disk with respect to read-write heads. The relative cost per bit of storage for DASD and RAM makes it necessary to use DASD for bulk storage and electronic RAM for processor internal memory and caching.

In a multi-echelon staged memory system, a cache is typically placed between a processor and a larger but slower memory device. For instance, caches employing appropriate devices are found between a processor and main memory and between main memory and a DASD. The caching technique arose from the observation that processors frequently cluster their references in time and space to small sub-sets of all data stored. Thus, if 80% of the immediate references are to 5% of the data space, then storing that popular 5% in cache significantly decreases average reference time because of the substantial access speed advantage of cache over main storage. The fundamental caching problem involves establishing an efficient scheme for allocating cache spatial and temporal resources among multiple concurrent processes and their referenced data.

When data referenced by a process is found in the cache memory, it is a "hit" and a copy of the requested data is sent to the requesting process. When the desired data is not found, it is a "miss" and the requested data is read from the larger, slower main storage device and transferred both to cache and to the requesting process. When the "miss" data is added to cache, it replaces selected data already in cache. When the replaced data is selected according to the Least Recently Used (LRU) algorithm, the cache is referred to as an LRU cache.

Where long strings of single references are made, such as to consecutive addresses defining a table, the LRU cache efficiency breaks down and the clustering advantage disappears. This is because the data not in cache must be continually staged up from the slower main storage device, resulting in continual cache "flushing". The "set-associative" cache organization scheme is an example known in the art as sometimes useful for reducing the effects of cache flushing by storing sets of sequential data of some length.

In U.S. Pat. No. 4,463,424 ("Method for Dynamically Allocating LRU-MRU Managed Memory Among Concurrent Sequential Processes", Jul. 31, 1984), Mattson, et al, disclose a method for dynamic adjustment of LRU cache partition size among a plurality of concurrent processes in a CPU as a direct function of a hit/miss ratio approximated from sampled reference traces. Mattson attempts to use hit/miss ratio to dynamically control cache space and time allocations for improved cache efficiency and to minimize the effects of flushing.

Reference should also be made to Cole, et al, U.S. Pat. No. 4,603,382, "Dynamic Buffer Reallocation", issued Jul., 29, 1986. Cole discloses an arrangement for varying the size of a tape buffer allocated to diverse tape units as a function of hit/miss ratio (data read misses or buffer full). Lastly, reference should be made to Dixon, et al, U.S. Pat. No. 4,489,378, "Automatic Adjustment of the Quantity of Pre-fetch Data in a Disk Cache Operation", issued Dec. 18, 1984. Dixon discloses a method for varying the amount of data prefetched to cache.

Cache management techniques for preserving process priority that exploit variations in reference patterns while optimizing prioritized partitioned cache performance are not known in the prior art. A method for cache space reallocation among prioritized partitions that both preserves priority and maximizes overall cache efficiency was unknown until now.

SUMMARY OF THE INVENTION

It is accordingly an object of this invention to devise a method for managing a LRU cache having data contents defined over a priority class range of 1 ... N by maximizing the number of hits within the global cache while also optimizing the number of cache hits within each priority class or partition consistent with preserving class priority. It is a related object of this invention that the method employ a cache located in a predetermined echelon of a CPU coupled, multi-echelon, staged storage system and that the data in the cache be cyclically referenced.

The aforementioned objects are satisfied in part by a first method predicated upon the unexpected observation that if the signed difference between an assigned and actual hit/miss ratio were to be used to dynamically allocate cache size to a class of data and correlate that assignment with priority of that class, then the actual cache hit/miss ratio could be maximized and priority among data sets preserved.

The first method implementing this observation involves initially partitioning the cache and assigning a target hit/miss ratio arbitrarily. Next, during subsequent reference cycles, the actual hit/miss ratio associated with each partition is periodically monitored and the size of each cache partition is altered as a function of the SIGNED difference between the actual and target hit/miss ratios. The alteration is such that a positive difference causes a reduction in partition size while a negative difference causes an increase in partition size. After this, the priority class of data referenced by the host to the staged storage system is ascertained. Lastly, a reference is either made to the partition 1 ... N correlated with the ascertained priority class 1 ... N, or the reference is made to the staged storage system.

Advantageously, the hit/miss ratio performance of a class of data can not be degraded beyond a predetermined level by a class of data having lower priority (assigned importance).

The objects of this invention are further satisfied by a second method predicated upon the unexpected observation that if each partition is independently managed by the LRU rule to preserve priority and if all such partitions are also forced to operate with a substantially identical value of hit rate slope, then the global cache hit rate is also maximized consistent with preserving partition priority structure. The cache partition hit rate is defined as the ratio of the change in partition hit rate divided by the associated change in partition space allocation. Hit rate is defined to be the product of hit ratio and I/O reference rate.

The first method does not prevent cache underutilization in a single partition because it doesn't consider weaknesses in the relationship between cache hit ratio and cache size, as expressed in the cache hit ratio function. For example, although hit ratios of 80% are common, an extraordinarily large cache is required to achieve hit ratios of 80% for some reference patterns such as the long sequential table. For other reference patterns, a 90% hit ratio may require only a small amount of cache space and limiting the hit ratio target to 70 or 80% would be wasteful of cheap and easy performance.

The second method of this invention for specifying a performance target relative to the hit rate slope requires more than the simple target hit ratio for each priority class used for the first method. Thus, the concept of a partition weighting factor is introduced as part of this invention. Each priority class is assigned a weighting factor. The greater the relative weight compared to other classes, the greater the priority class performance relative to the respective hit rate slope. These weighting factors provide an additional partition space allocation bias such that a higher priority partition is assured of operating above the knee of the hit rate curve while a lower priority partition may operate at or below the knee of its curve. Because each partition is then operated with a cache space allocation appropriate to its respective data reference pattern, global cache efficiency is thereby optimized.

The second method of this invention includes initially partitioning the cache and assigning a priority class value, by specifying a weighting factor, and an arbitrary hit rate to the initial space allocation for each partition. During each subsequent reference cycle, the actual hit rate is then measured for each partition and the actual hit rate slope is determined from the ratio of the change in measured hit rate to the corresponding change in partition space allocation. The actual hit rate slope is next multiplied by the corresponding partition weighting factor to determine a weighted hit rate slope value for each partition. Next, a new space allocation is determined for each partition as a function of the changes needed to equalize the most recent measured weighted hit rate slope values across all partitions. Finally, the cache space is reallocated in two steps. First, all partitions having a non-positive weighted hit rate slope value are logically segregated from the remaining cache space and left substantially unchanged in size. Secondly, the "remainder" of the cache space is reallocated among the remaining partitions (having positive weighted hit rate slopes) by changing each partition space allocation in a direction tending to equalize the weighted hit rate slope values among all positive slope partitions. A Volatility Index (VI) factor for limiting the available fraction of this remaining cache space for such reallocation is preferred.

These steps are repeated periodically, thereby serving to dynamically reoptimize overall cache hit rate while preserving class priorities as the multiple concurrent processes evolve in number and characteristics.

The foregoing, together with other features and advantages of the present invention will become more apparent when referring to the following specifications, claims and the accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 1 sets out a PASCAL-like pseudo-code flow of control for a p-way set-associative cache;

FIG. 2 defines global constants used in a PASCAL-like implementation of the first method of the invention;

FIG. 3 prescribes global type definitions for the first method of the invention;

FIG. 4 sets forth global variable definitions for the first method of the invention;

FIG. 5 shows the prioritized cache driver in a PASCAL-like pseudo code flow of control for the first method of the invention;

FIG. 9 prescribes global type definitions used in a PASCAL implementation of the second method of this invention;

FIG. 10 prescribes global variable definition used in a PASCAL implementation of the second method of this invention;

FIG. 11 defines the initial values for general constants used in a PASCAL-like implementation of the second method of this invention; and FIG. 12 defines initial value for priority class constants used in a PASCAL-like implementation of the second method of this invention.

DETAILED DESCRIPTION OF THE PREFERRED EMBODIMENTS

Figure 6:
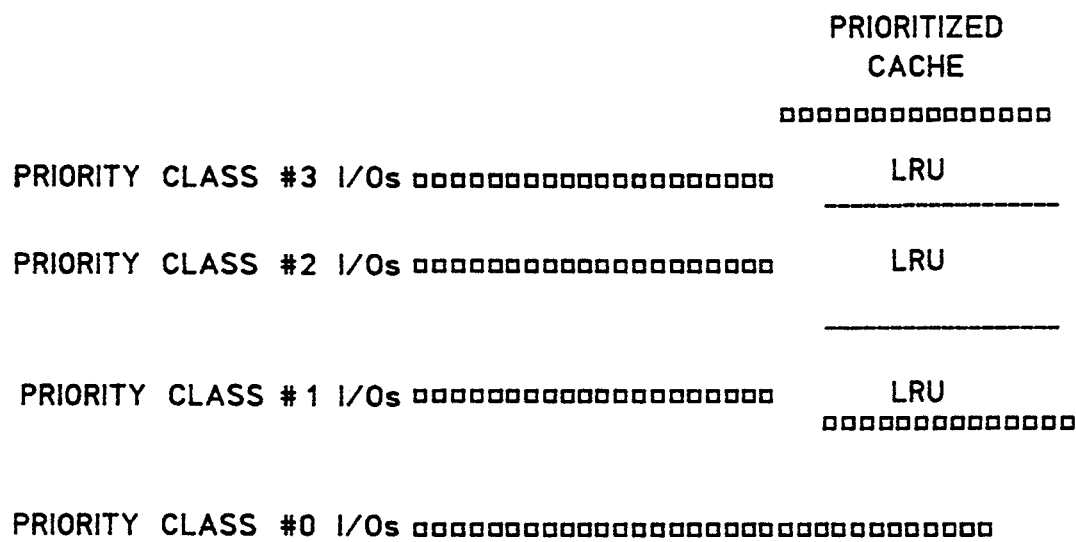
FIG. 6 illustrates CPU dispatching prioritized cache references (I/O's) for the first method of the invention.

The methods of this invention are executable upon a computing system of the type including one or more CPU's, each CPU having a main store, input/output channel, control unit, direct access storage devices (DASD), and other I/O devices coupled thereto. Such a system is described in G. M. Amdhal, et al, U.S. Pat. No. 3,400,371, issued Sep. 3, 1968, and entitled, "Data Processing System", The IBM system described therein includes as a resource all of the facilities of either the computing system or the operating system running thereon which are required for the execution of a process. Typical resources include a main store, I/O devices, the CPU, data sets, and control or processing programs. Moreover, said systems are capable of "multi-programming". This pertains to the concurrent execution of two or more processes by computing system and can be managed on a computer running under IBM's system/370/XA Operating System, as described in IBM Publication GC 28-1154, July 1973, and listed in IBM's system/370/XA Bibliography, GC20/0001.

This invention is intended to be used in an operating system environment containing a conventional data management facility that manages auxiliary storage and provides traditional program compiler and assembly capabilities. The methods of this invention are accordingly described in a pseudo-code flow of control that is similar to the PASCAL language syntax and convention. The pseudo-code syntax and conventions can be readily understood by referring to PASCAL conventions, which may be found in any standard reference work such as Jensen and Wirth, "PASCAL USER MANUAL AND REPORT", 2nd Edition, Copyright 1974 by Springer-Verlag New York, N.Y. The method steps of this invention are illustrated in the tables and drawings in PASCAL-like notation and syntax.

A FIRST METHOD FOR PRESERVING PARTITION PRIORITY

CPU Access to Attached DASD

Data sets are frequently stored on DASD volumes. A CPU's relationship with a DASD begins when a CPU invokes a START I/O instruction. This instruction establishes a connection between the CPU and the addressed device and starts the execution of a channel program with the device. The invocation of the START I/O instruction causes control to be relinquished to a series of channel commands. This series or chain of channel commands (CCW's) is, in turn, sent over a channel to a control unit for the purpose of selecting and accessing the device and effectuating data movement across interfaces. Each channel program consists of a sequential list of operations resident in the CPU internal or main memory. The transmission to and the execution at the control unit of the CCW's takes place only after interconnection between the CPU and the control unit. For each operation (CCW) in the channel program, one or more counterpart operations are required either at the control unit or device level over an active connection. The first active connection is that of an initial selection sequence. This sequence is invoked with a START I/O operation in which an initial path is set up both electrically and logically in terms of device address (virtual/real) and device status (available/busy). The next active connection relates to that of the CCW transfer and execution. A control CCW, such as SEEK, requires physical positioning or activity at the device. A control unit, in response to receipt of the control CCW, can execute the CCW in disconnected mode.

In contrast to disconnected modes, CCW's involving the movement of data between the channel and devices, such as READ and WRITE CCW's, require continued connection of the control unit unit to the channel in order to effectuate the data transfer. A typical configuration, including multiple CPU's accessing shared devices over logically independent paths, is described in Luiz, et al, U.S. Pat. No. 4,207,609, entitled "METHOD AND MEANS FOR PATH INDEPENDENT DEVICE RESERVATION AND RECONNECTION IN A MULTI-CPU AND SHARED DEVICE ACCESS SYSTEM", issued Jun. 10, 1980.

Prioritized Cache and the Setting of Performance Targets

Suppose that there are ten data sets (A, . . . J) which could potentially use the same cache. For extrinsic reasons, it is desired to set the cache performance of data sets B, C, and H higher than that of data sets D, E, and J. Also, data sets A, F, and G have the least priority or significance. Lastly, data set I need not even be cached. This can be depicted as:

Highest Priority 3: B, C, H
Next Priority 2: D, E, J
Lowest Priority 1: A, F, G
Not in Cache 0: I Having established the relative priorities, it now becomes necessary to determine the read hit/miss ratio targets which each group is to achieve. Even though priority group #3 is the highest priority in this example, its target hit/miss ratio does not have to be the highest of all of the groups. Note that priority #0 is special in that data in that priority group is never allowed to use the cache (i.e., BYPASS cache), thus, there is no reason to establish a target hit/miss ratio for priority #0.

In this illustration, arbitrary read hit/miss ratio targets have been set for each of the priority groups as follows:

(1) References to data in priority class #0 will NOT use the cache resource.
(2) If the references to data in priority class #1 are able to use the cache resource, then priority #2 will have an average read hit/miss ratio greater than or equal to 87%.
(3) If the references to data in priority class #2 are able to use the cache resource, then priority #3 will have an average read hit/miss ratio greater than or equal to 80%.

Assuming that there are sufficient cache resources to meet the highest priority's target, then the remaining cache resources are used to meet the hit/miss ratio target for the next highest priority class. Any resources still available will then be used toward benefitting the next lower priority class, etc. The process iterates in this manner until priority class #1 is meeting its target. Any cache resources which still remain can then be distributed in any way among the various priority classes.

Reference now should be made to FIG. 1, which distributes cache among the partitions according to their priority order as a function of a WHILE . . . DO loop. It should be appreciated that the prioritized cache is really a p-way set-associative cache (where p is the number of cached priority classes). The value of partitioning the cache for each priority class is that each priority class is thus able to enjoy the full benefits of an LRU caching scheme with no danger of affecting the cache performance of a higher priority class.

Aspects of the Implementation of the First Method

To fully appreciate the first method of this invention, a pseudo-code model in PASCAL language notation is set forth in figures and tables suitable for use with a single cache control unit or resource manager. The presentation observes the following order in PASCAL syntax:

| Syntactical Element | Figure or Table |
| --- | --- |
| (1) Constants | FIG. 2 |
| (2) Types (description of variable structures) | FIG. 3 |
| (3) Global Variables | FIG. 4 |
| (4) Initialization of variables including cache memory | Table 1 |
| (5) Procedures manifesting aspects of the method steps | |
|    (a) reassignment of cache from one partition to another | Table 2 |
|    (b) tuning the prioritized cache partition sizes | Table 3 |
|    (c) issuing a cache I/O | Table 4 |
| (6) Main Cache Control Procedure | FIG. 5 |

Definition and Initialization of Global Elements

Referring now to FIGS. 2-4, there is set out a counterpart list of global constants, types, and variables. Associated with each constant, type, or variable is a comment field defining the element and the method of its value selection or structure.

The present implementation of the first method requires that the variables and cache memory be initialized according to the procedure set out in Table 1. Once the global variables have been created and initialized, the prioritized cache can begin to ensure prioritized cache performance.

Referring to Table 1, the cache nodes are allocated as well as initialized. In the case where the cache nodes already exist, rather than allocating memory for each of the nodes, one would transfer them from the existing cache memory instead.

Procedures Manifesting Aspects of the First Method Steps

Referring now to Tables 2, 3, and 4, there is set a pseudo-code listing for internal cache processing covering cache transfer, tuning in a prioritized cache, and cache issuing an I/O request. The pseudo-code for the procedure denominated "Cache_xfer" is set forth. However, the actual transfer of the cache memory would almost certainly be done in the microcode logic of the control unit itself. The "Prioritized_Caching_Tuning" decides how much cache memory to transfer from one cache partition to another. Finally, the last routine, "Issue Prioritized_Cache IO" displays the logic sequence which would take place with each I/O to be issued.

Cache Transfer

Referring again to Table 2, the procedure shown should reside within the control unit. In such a case, each call to this procedure should be considered as some information relayed to the control unit to reallocate logical cache partition sizes. The actual information to be relayed to the control unit could be transmitted as part of a CCW, for example. The parameters used are necessary information elements to be used by the cache control unit or resource manager. Namely, identifiers to designate the two logical partitions to exchange cache memory, and the amount of cache memory to be transferred. As a result of running this procedure, 'n' cache cells will have been transferred from the cache partition represented by 'src' to the one represented by 'dest'.

Adjustment of Cache Space As Among the Prioritized Datasets

Referring again to Table 3, there is set forth the reiterative adjustment called for by the first method of this invention. The required steps include:

1. Determine whether each priority class is meeting, exceeding, or failing to meet its objectives (using a weighted running average).
2. Based upon the difference between the target objective and running average, predict what SIGNED change in the cache size will yield a read hit/miss ratio closer to the target.
3. Sum the SIGNED changes for all of the priority classes, and if the result is less than or equal to zero, then there is at least as much cache as is needed (go to step 4). Otherwise, there is more cache needed than is available (go to step 5).
4. If there is at least as much cache as is needed, then distribute all of the excess cache memory in proportion to the number of cached read I/O's to each of the prioritized classes.
5. If more cache is needed than is available, then make sure that the highest priority classes have their needs met, even if it means robbing cache from the lowest classes.
6. Finally, transfer the recommended amounts of cache memory from/to each of the priority classes.

In this procedure, 'Nreads' is a variable for keeping track of the Running Average number of cached read I/O's for cache of the priority classes. Note: this is comparable to using the cached read I/O rates since all priority classes began at the same time. The variable 'Residue' keeps a running sum of the recommended SIGNED changes in the cache memory sizes of each of the priority classes. If the final result of 'Residue' is less than zero, then there is more demand for cache memory than supply (by the amount='Residue'). If the final result of 'Residue' is greater or equal to zero, then there is more supply of cache memory than demand (by the amount='Residue'). Note that 'Residue' is the negative of the sum of the SIGNED changes in the cache sizes for each of the priority classes.

For each of the priority classes in this procedure, a comparison is performed between the running average results and those of the target. Based on the difference, the SIGNED change in the cache size is computed. Also, running sum of each of the variable 'Nreads' and 'Residue', are kept respectively.

Issuance of Cache I/O

Referring now to Table 4, the procedure supports the proposition that for every I/O of a given cache priority class, to be issued to the Control Unit, 'Priority No' representing the cache priority class number should be executed.

Main Prioritized Cache Driver

Referring now to FIG. 5, the main procedure comprising a pair of IF THEN ELSE routines is built within a REPEAT . . . UNTIL loop. The major structures support assigning priorities and targets to data sets and then tuning performance after a period of referencing experience.

Illustrative Example of the First Method

PRIORITIZED CACHE I/O

Referring now to FIG. 6, there is shown a single physical cache in which each cached priority class makes use of its own LRU cache partition. For instance, a priority class #2 I/O request will take advantage of the middle cache partition (FIG. 6). A priority class #0

I/O request will go straight to the storage medium, not taking advantage of any cache partition, and so on.

Figure 7:
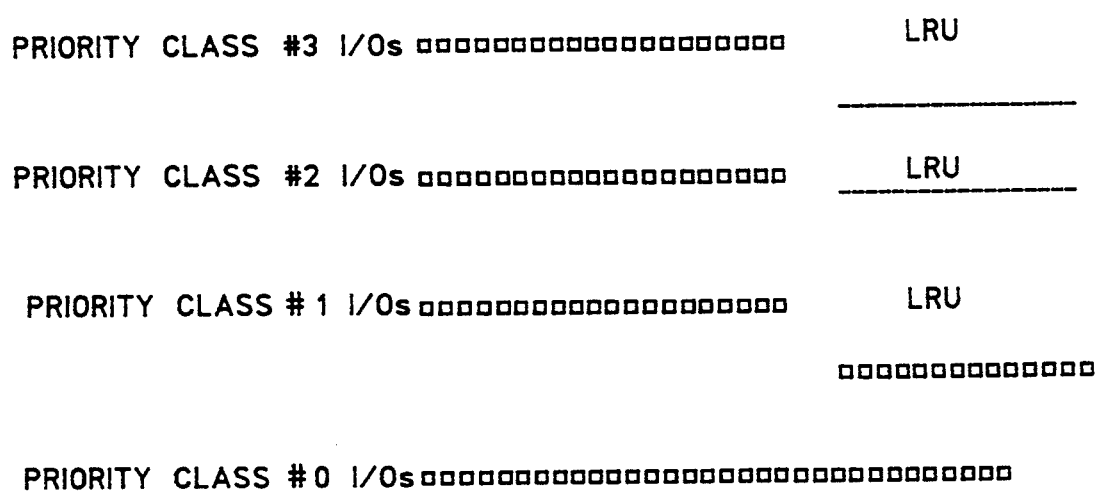
FIG. 7 also illustrates the CPU dispatching cache references where a change of partition sizes has occurred according to the first method of the invention.

As previously explained, the performance of each of the cache partitions periodically must be examined to ensure that the prioritized cache read hit/miss ratio targets are being met. As a result of each performance examination the cache partition sizes may be altered. This is shown with respect to FIG. 7.

Cache Partition Size Tuning

The tabular illustration shown below is a reasonable approximation to those values found in practice. The tabular illustration assumes respective cache sizes for each of the priority classes, and the running averages for the read hit ratio and the I/O rate were measured and available at the time that the "Prioritized_Caching_Tuning" routine is to be invoked and the automatic adjustments can be computed.

| Priority | Target | Cache Size | Read Hit Ratio | Cached I/O Rate |
|---|---|---|---|---|
| 3 | 80% | 40 | 70% | 11 |
| 2 | 87% | 100 | 97% | 30 |
| 1 | 55% | 60 | 35% | 15 |
| 0 | — | 0 | — | 15 |

It is believed instructive at this point to summarize the steps according to the first method of this invention peculiar to this phase. These include:

(1) Determine how each priority class is doing as compared to its target.

(2) Predict the SIGNED change in the cache size that should correct the situation.

(3) Add the recommended changes to the cache size (for all of the priority classes).

(4) If (sum<=0) then, distribute the extra cache according to the I/O rates.

(5) If (sum>0) then, take cache from the lowest priorities as needed.

(6) Transfer the cache memory according to the computed recommendations.

Correlating the Steps with the Tabular Illustration

Step #1. Determine how each priority class is doing as compared to its target:
 priority class #3: hit/miss ratio too LOW by 10%
 priority class #2: hit/miss ratio too HIGH by 10%
 priority class #1: hit/miss ratio too LOW BY 20%
 priority class #0: not to be examined Step #2. Predict the SIGNED change in the cache size that should correct the situation (this step assumes that the running average hit/miss ratio will change by 20 percentage points every time the cache size is either halved or doubled):
 priority class #3: Needs 17 more units of cache
 priority class #2: Is to lose 29 units of cache
 priority class #1: Needs 60 more units of cache
 priority class #0: Not Applicable Step #3. Add the recommended changes to the cache size for all of the priority classes, yielding:

17+ −19+60= +48

Step #4. If (sum <=0) then, distribute the extra cache according to the I/O rates. Note, that Step #4 is not applicable.

Step #5. If (sum >0) then, take cache from the lowest priorities as needed:
 The cache memory shortage is "+48" cache units. The objective for step 5 can be met by merely reducing the cache memory increase which goes to priority #1, by 48 cache units. The adjusted cache memory changes for each of the priority classes now becomes:
 Priority class #3: Increase by 17 more units of cache
 Priority class #2: Decrease by 29 units of cache
 Priority class #1: Increase by 12 more units of cache
 Priority class #0: Not Applicable Step #6. Transfer the cache memory according to the computed recommendations.

Following the execution of this step, the cache size as shown in the tabular illustration would change as follows:

| Priority | Target | New Cache Size |
|---|---|---|
| 3 | 80% | 57 |
| 2 | 87% | 71 |
| 1 | 55% | 72 |

A SECOND METHOD FOR CACHE OPTIMIZATION

Figure 8:
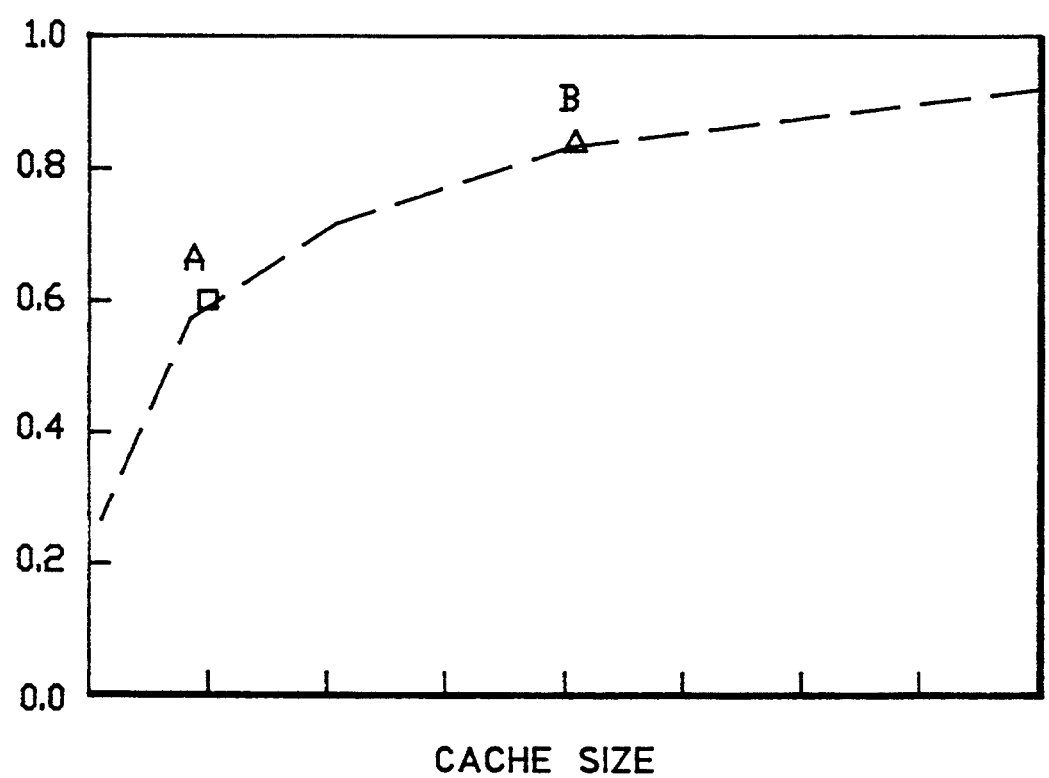
FIG. 8 shows a typical read hit ratio function with respect to cache space allocation.

The second method of this invention improves on the first method for maximizing the number of cache partition hits consistent with preserving cache partition priority discussed above in connection with FIGS. 1–7. Referring to FIG. 8, a typical read hit ratio function is illustrated showing the relationship between read hit ratio and cache partition size. The points A and B represent two exemplary hit ratio targets on the curve. Note that target ratio A requires a much smaller cache space allocation than target ratio B and that a change in space allocation has more effect at A (higher hit ratio slope) than at B.

In FIG. 8, it can be seen that doubling the amount of cache space allocated to partition A would increase the read hit ratio from around 60% to almost 75%, an increase of approximately 15 percentage points. However, adding the same amount of cache to B's partition would increase the read hit ratio only by 2–3 percentage points. Taking away some of the cache from partition B would decrease the hit ratio only by a few percentage points. Thus, the caching system in this example would generate more total hits by taking away some of the space from partition B and adding it to partition A. In fact, as long as B is above A on the hit ratio curve, the total number of hits will continue to improve as space is taken from partition B and added to partition A. Once both have moved to the same position on the curve, then cache memory transfers between them should cease.

This discussion was simplified in two respects. First, in reality, the I/O rates are seldom equivalent for each partition and, secondly, the hit ratio curve itself is also generally different for each partition. The differences among hit ratio curves are easily addressed with the assumption that the hit ratio curve is monotonic as a function of the cache size. This assumption requires that the hit ratio slope always increase as cache space is taken away and always decease as cache space is added. Although not strictly true, this assumption is accurate enough to ensure near-optimal results. Thus, as long as the hit rate for each partition is forced to a point on the curve of equal slope, each partition will end up operating as high on its hit ratio knee as is globally advantageous. If the curves were identical across the partitions, the equal slope requirement would force the targets to identical space allocations as seen in the above discussion. Thus, the second method of this invention can be considered a technique for adjusting the target for each partition to ensure that every partition operates in the same vicinity of the "knee" of its own curve. The knee of a typical hit ratio curve is seen in the region between target values A and B in FIG. 8.

The differences in partition I/O rates are addressed by balancing the partition hit rate slopes as opposed to the hit ratio slopes. The following example clarifies this point. Suppose that some cache partition X has an I/O rate of 100 calls per second and that some partition Y has a rate of 10 calls per second. Consider a cache space transfer from Y to X such that X's hit ratio will improve one percentage point at a cost of a two percentage point decline for partition Y. Since X's I/O rate is 100, a one percentage point increase in the hit ratio means that one additional hit per second will occur in partition X (because 100 calls per second times one percent equals one) and that Y will see 0.2 fewer hits per second (because 10 calls per second times two percent equals 0.2). Thus, even though the hit ratio declined more for partition Y because of the cache memory space transfer to partition X, the total number of hits for the global cache system increased by 0.8 hits per second (1.0-0.2), which is an improvement in global cache efficiency. The hit rate slope is computed by multiplying the hit ratio slope by the I/O rate. In this example, balancing the hit rate slopes for all of the partitions has maximized the number of hits for the global cache system.

Accordingly, the second method of this invention extends and exploits this unexpected observation that global cache performance is improved when hit ratio targets are set by weighting each hit rate curve and placing the targets at the knee of the weighted curve for each of several priority classes. Thus, a properly weighted higher priority partition is assured of receiving enough cache space to put it modestly above the knee of the unweighted curve, while a lower priority partition can be operated slightly below the knee of its unweighted curve. Each partition is then afforded a cache size appropriate to its I/O reference pattern. Cache space is not arbitrarily wasted in the higher priority partition by meeting an unnecessarily high hit ratio target.

Summarizing, because of the higher hit rate slope at target value A in FIG. 8, small increases in partition size result in large increases in partition efficiency. On the other hand, the lower slope at hit ratio target B requires large increases in partition size allocation to obtain modest improvement in partition efficiency. The hit rate curve is obtained from the hit ratio curve by multiplying with the partition I/O rate. The knee of either the rate or ratio curve is that region where increases in partition space allocation quickly lose their effect in improving partition efficiency. Rather than attempting to precisely locate the knee, the second method of this invention forces all priority classes to operate at the same point on the "weighted" hit rate curve. This requirement unexpectedly gives optimal global cache performance efficiency consistent with class priority preservation. This may be further appreciated with reference to the following discussion.

The simple hit ratio target specification discussed above in connection with FIGS. 1-7 is insufficient by itself to specify a performance target relative to the knee of the hit rate curve. Thus, each priority class is given a weighting factor. The greater this weighting factor compared to that of other classes, the higher will be the operating point of the class partitions on their own unweighted hit rate curve knees.

To fully appreciate the second method of this invention, a pseudo-code model in PASCAL-like language notation is set forth in FIGS. 8-12 that is suitable for use with a single cache control unit, a cache controlled by the CPU, or a resource manager. The presentation observes the following order in PASCAL-like syntax:

| Syntactical Element | Figure |
|---|---|
| (1) Constants | Table 5 |
| (2) Types (Variable Structures) | FIG. 9 |
| (3) Global Variables | FIG. 10 |
| (4) Initialization | |
| General Data Structures | FIG. 11 |
| Each Priority Class | FIG. 12 |
| (5) Procedures Manifesting Aspects of the Method Steps | |
| (a) Compute the read ratio for current interval and slope | Table 5 |
| (b) Keep shrinking inactive priority classes | Table 5 |
| (c) Compute slope rate procedures and handle special slope values | Table 5 |
| (d) Determine aggregate cache space for reallocation | Table 5 |
| (e) Non-positive slope classes | Table 5 |

Referring now to Table 5 and FIGS. 9-10, there are set out counterpart lists of global constants, types and variables. Associated with each constant, type or variable is a comment field defining the element and the method of its value selection structure.

The present implementation of the second method requires initialization of the variables and cache memory according to the procedures set out in FIGS. 11-12. FIG. 11 sets forth the necessary general initializations and FIG. 12 sets forth the initializations required for each of a plurality of priority classes. Once the global variables are created and initialized, the Evaluation Interval Processing (EIP) routine (Table 5) can determine cache size allocations for each priority class. This EIP routine is run at each evaluation interval (PC.EInterval) and the resulting space allocation changes (SzChg) are stored in the SzChg field for each priority class. The evaluation interval routine is executed after each PC.EInterval seconds. Useful values for PC.EInterval range from 50 to 900 seconds.

Once the cache partitions are in existence, this method merely reallocates aggregate cache memory among the various partitions rather than allocating new memory to the cache. Experimental observations show that the cache space allocations continue to dynamically change over time in response to changing processes, although the hit rates appear to stabilize after about ten minutes.

The EIP procedure set forth in Table 5 can be better understood by considering the following discussion of the non-iterative dynamic cache size allocation procedure of this invention. It has been observed that the change in the hit ratio is reasonably constant as a function of doubling or halving the amount of memory available to the cache. This observation is made only for moderate cache sizes and breaks down for extremely small or extremely large cache sizes. Accordingly, a predicted hit rate slope $S(x)$ for a cache size of x cache slots can be written as a simple function of the hit rate slope (Slope) measured in a prior EIP interval where the cache partition size was an average of n slots, thus:

$S(x) = \text{Slope} \cdot n/x$. This simple function reflects a fixed exponential relationship between cache size and hit ratio. Following initialization and completion of at least one EIP cycle, a constant, $K = S(n_j) \cdot \text{Weight}_j$, which governs the presumed exponential relationship is determined for an arbitrarily-selected ($j^{th}$) partition having a weighting factor = $\text{Weight}_j$ and an average size $n_j$.

Once constant K is determined (Table 5), it is used to compute a new partition size for every other partition having weighting factors = $\text{Weight}_p$, according to $x_p = S(n_p) \cdot \text{Weight}_p / K \cdot n_p$. This new size or space allocation is computed by combining constant K with the difference between partition hit rate slope ($\text{Slope}_p$) measured during the prior EIP cycle and the hit rate slope ($\text{Slope}_j$) measured for the $j^{th}$ partition. Thus, new space allocations $x_p$ are determined for all partitions in a single, non-iterative step based on the observed exponential relationship between hit ratio and partition size.

The measured hit rate slopes are multiplied by the appropriate weighting factors in the manner set forth in Table 5. Also, where the measured weighted hit rate slopes are non-positive, the respective partitions are logically segregated and exempted from the space reallocation procedures applied to the positive slope partitions. After segregating the non-positive slope partitions, the remaining aggregate cache space held by the positive slope partitions is then redistributed prorata according to the new partition sizes $x_p$ computed as discussed above. The exact procedure is set forth in Table5.

Although the classes with negative slope are not given cache according to the method of the algorithm, it is useful to change their cache allocations by some arbitrary amount to assist in providing future HR slope measurements. If left completely unchanged, there may not be a second point for use in estimating the slope during the next iteration.

It has been observed that the cache performance optimization process is improved by a method of this invention for imposing a "Volatility Index" parameter on the aggregate positive slope partition space. This can be appreciated by examining Table 5 and noting that only a fraction of the aggregate positive slope partition cache space is reallocated. The Volatility Index (VI) can range from zero (stationary case) to 1.0 (full reallocation). A VI of approximately 0.5 or less is useful.

This second method of the present invention has been tested with a trace-driven control unit cache simulation model. Because the procedure is dynamic and requires significant time (circa ten minutes) to initially adjust the various cache sizes, a particular lengthy I/O trace was employed, being for a single control unit having thirteen attached devices.

Examination of several combinations of VI and evaluation interval time PC.EInterval has shown that a combination of VI=0.10 and PC.EInterval=50 seconds is useful for cache optimization. Other combinations were found which yield similarly useful results.

The global performance of this second dynamic cache partition reallocation method was observed to be even better than the conventional global LRU cache method for smaller cache sizes having up to 13 partitions. However, for most larger cache sizes, the global LRU method gives better global performance than the fully-weighted priority class partition method of this invention. When applying weighting factors to the prioritized cache partitions, reasonable care in selecting class weighting factors can improve the number of hits over the global cache within the prioritization constraints imposed by the weights, although no improvement over the global cache is expected. It is sometimes noticed when the weight factors are all equivalent. To the extent the weight factors are different, the global performance is degraded as a trade-off to improve the heavily weighted classes.

The weighting factors selected for the second method of the present invention may either be fixed or variable. Variable weighting factors may be useful in controlling the response time of the present method for different priority classes. The weighting factors of those priority groups that are exceeding their response time goals might be reduced relative to the weighting factors of those groups not currently meeting their response time goals. The only fixed requirement is that the actual weighting factors be always greater than zero.

Although the pattern of write I/O's is significantly different from that of read I/O's, the write hit ratio results were observed to conform to the results observed for the read ratios. Read hit ratios (hit rate/reference rate) were observed to actually improve in some cases upon dynamic balancing of the read rate slopes of some number of equally-weighted priority classes. The caching performance for the more heavily-weighted priority groups experienced the greatest ratio improvements, although at the expense of the less heavily-weighted groups and sometimes even at the expense of global ratio results. The improvement for each priority class was compared to the class's earlier hit ratio performance and not to the (perhaps unfeasible) absolute hit ratio target used in the first method discussed above in connection with FIGS. 1-7.

AN ALTERNATIVE IMPLEMENTATION MODEL FOR THE TWO METHODS

The two methods of this invention have been described with reference to a procedural model of control. That is, the CPU and storage resource management used to express the method steps have been in the form of a PASCAL-based pseudo-code flow-of-control and data pathing. These method steps may also be implemented with reference to a pattern-sensitive, ruled-based, inferencing model without undue experimentation. That is, the first method steps of:

assigning data set prioritization, hit ratios, and cache size, relative magnitude comparing the actual and target ratios, and readjusting cache space on an LRU basis as a function of the sign of the comparison;

or the second method steps of:

assigning weight factors to partition classes, measuring the actual hit rate slope for all cache partitions, determining a weighted hit rate slope for all cache partitions, calculating an exponential hit ratio constant for an arbitrary partition, estimating accordingly the space allocation change to each partition necessary to equalize the weighted hit rate slope for all partitions, and reallocating accordingly a fraction of the aggregate positive-slope cache space among the positive-slope partitions without substantially changing the space allocation among the non-positive-slope partitions;

can be encoded as unordered finite sequences of rules in which each rule represents an ordered pair of a condition (state set) and action statements.

Rule-based systems are cyclic and operate inferentially in either a forward or backward chaining manner. The implementation of interest is data or pattern driven in a forward chaining manner. During a cycle, forward chained systems use data or data changes to select out the rules having pattern parts matching the data (to form a conflict set) and then select and execute one of the rules according to a predetermined criterion (recency). Rule execution means taking the specified action whether it involves a routine execution or invoking another rule. Typically, the system data state is altered in some manner after which the cycle repeats.

As applied above, the control data includes the data set names, priorities, weighting factors, actual hit rate slopes, and so forth, in addition to rules whose action parts can modify the control data and perform the other specified steps. The cycle of processing includes (a) identifying that subset of rules having a condition or pattern-part matching the data, (b) selecting at least one rule of the identified subset of rules according to an extrinsic protocol, and (c) executing the action prescribed by the action-part of the selected rule, including actions causing data base modification.

Reference is made to Brownston, et al, "Programming Expert Systems in OPS5" copyright 1985 by Addison Wesley Publishing Company for a description of a model forward-chained inferencing system. Also, reference is made to "KnowledgeTool User's Guide and Reference" IBM Publication SH20-9251. KnowledgeTool (TM) is a version of the procedural language PL/1 extended to include forward chained inferencing system constructs.

Clearly, other embodiments and modifications of the present invention will occur readily to those of ordinary skill in the art in view of these teachings. Therefore, this invention is be limited to only by the following claims, which include all such embodiments and modifications.

I claim:

1. A computer-implemented method for managing a Least Recently Used (LRU) cache having storage space occupied by data contents defined over a priority class range 1 ... N, said cache being located in a predetermined echelon of a CPU-coupled, multi-echelon, staged data storage system, data in said cache being referenced by read and write operations in a cycle, the time rate of said read and write references to said cache data being termed the hit rate, said method comprising the steps of:

initially partitioning said cache into a plurality of cache partitions and assigning a hit rate estimate and a data storage space allocation to each said cache partition; and during each cycle of a plurality of consecutive cycles, performing the steps of:

ascertaining a hit rate slope for each said cache partition, said hit rate slope corresponding to the ratio of a change in the hit rate in said each partition to a corresponding change in cache data storage space allocated to said each partition, and adjusting said cache data storage space allocation assigned to each said cache partition to render the respective hit rate slopes substantially equal among all said cache partitions.

2. The method of claim 1, wherein the cache data storage space adjusting step comprises the additional steps of:

estimating an available cache storage space supply by adding the adjustments for said cache data storage space allocations assigned to all said partitions having a positive hit rate slope for which a space decrease is required to equalize said hit rate slopes;

estimating a cache storage space requirement by adding the adjustments for all said partitions having a positive hit rate slope for which a space increase is required to equalize said hit rate slopes; and reallocating said cache data storage space supply among all said cache partitions having a positive hit rate slope for which a cache storage space increase is required on a prorate basis according to the ratio of said cache storage space supply to said cache storage space requirement.

3. The method of claim 2, wherein said cache storage space supply is reduced during the cache data storage space adjusting step proportionately to the valuation of a volatility index factor of no more than unity.

4. The method of claim 1, wherein said cache is a N-way set-associative cache, N being the number of cache priority classes.

5. The method of claim 1, wherein said hit rate slope for said each cache partition is first adjusted proportionately to a weighting factor corresponding to said each cache partition.

6. The method of claim 1, wherein said method uses a cyclic, rules-based, control data sensitive inferencing system, said control data including cache parametric values of partition size, priority, weighting factor, estimated hit rate slope and actual hit rate slope, said system including storage means for storing control data and rules, and execution means cooperating with said storage means for executing a control cycle, each said rule having pattern-indicating and action-specifying parts thereof, comprising the cyclic steps of:

identifying an executable subset of rules by matching the pattern-indicating parts of the rules to those elements of control data in said storage means that were modified or created during a preceding cycle;

selecting a rule from said executable subset of rules; and executing the action according to the action-specifying part of the selected rule.

7. In a CPU-coupled, multi-echelon, staged data storage system, a computer-implemented method for managing a partitioned cache located at a predetermined echelon of said data storage system, said cache for storing data for immediate reference by CPU read and write operations, said method comprising the steps of:

initially partitioning said cache into a plurality of cache partitions;

for each cache partition:

initially assigning a cache storage space allocation, and ascertaining a cache hit rate slope that corresponds to a ratio of a change in a reference hit rate to the corresponding change in said storage space allocation necessary to create said change in reference hit rate, said reference hit rate corresponding to the time rate at which references are made to data which is in said each cache partition;

comparing the cache hit rate slope of a first cache partition with the cache hit rate slope of a second cache partition;

if the cache hit rate slope of said first cache partition is less than the cache hit rate slope of said second cache, deleting cache storage space from said first cache partition and adding it to the cache storage space allocated to said second partition; otherwise, repeating the comparing and deleting steps.

8. The method of claim 7, wherein the comparing and deleting steps are performed in sequence continuously until the cache hit rate of said first cache partition substantially equals the cache hit rate of said second cache partition.

9. The method of claim 7, further including the steps of:

for each cache partition:
initially assigning a priority value, and
ascertaining a weighted cache hit rate slope which corresponds to the product of said hit rate slope and said priority value;
the comparing step including comparing the weighted cache hit rate slope of said first cache partition with the weighted cache hit rate slope of said second cache partition; and
said deleting step including deleting allocated cache storage space from said first cache partition and adding it to cache storage space allocated to said second partition if the weighted cache hit rate slope of said first partition is less than the cache hit rate slope of said second partition.

10. A computer-implemented method for managing a LRU cache having data contents in a plurality of cache partitions defined over a priority class range of 1 ... N, said cache being located in a predetermined echelon of a CPU-coupled, multi-echelon, staged storage system, data in said cache being referenced by read and write operations in a cycle, a cache partition metric termed "hit rate slope" being the ratio of a change in the time rate of said references to data located in the respective said cache partition to a corresponding change in the cache data storage space allocated to the respective said cache partition, said method comprising the steps of:

assigning a priority value, a weighting factor, a first hit rate estimate and a first space allocation to each of N cache partitions;

measuring the actual hit rate slope for each said cache partition;

determining a weighted hit rate slope for each said cache partition, said weighted hit rate slope being equal to the product of the respective actual hit rate slope and the respective weighting factor;

estimating the cache data storage space allocation change for each said cache partition required to equalize the weighted hit rate slope for all said cache partitions; and reallocating a fraction of the aggregate cache data storage space among said cache partitions for which said weighted hit rate slope is positive, in proportion to the corresponding said cache data storage space allocation changes, without substantially changing the existing cache data storage space allocation among said cache partitions for which said weighted hit rate slope is non-positive, said fraction being no more than unity.

11. The method of claim 10, wherein the measuring step for the actual hit rate slope uses a weighted running average.

12. The method of claim 10, wherein said fraction of aggregate positive-slope cache space is limited according to a volatility index parameter that is no more than unity.

* * * * *

UNITED STATES PATENT AND TRADEMARK OFFICE
CERTIFICATE OF CORRECTION

PATENT NO.   :   5,394,531
DATED        :   February 28, 1995
INVENTOR(S)  :   Smith It is certified that error appears in the above-indentified patent and that said Letters Patent is hereby corrected as shown below:

Column 16, line 13, replace "prorate" with --prorata--.

Column 17, line 1, replace first occurrance of "cache" with
        --cache partition-- ;
            lines 4, 25, 26, and 27, replace "partition" with
    --cache partition--.

Signed and Sealed this

Fourth Day of July, 1995

Attest:

BRUCE LEHMAN

*Attesting Officer*  *Commissioner of Patents and Trademarks*